(12) United States Patent
Muller et al.

(10) Patent No.: US 9,718,079 B2
(45) Date of Patent: Aug. 1, 2017

(54) METHOD AND APPARATUS FOR TREATING COMPONENTS

(71) Applicant: WMV Apparatebau GmbH, Windeck (DE)

(72) Inventors: Martin Muller, Hennef (DE); Jurgen Muller, Sankt Augustin (DE); Hubert Jongen, Windeck (DE)

(73) Assignee: WMV Apparatebau GmbH, Windeck (DE)

( * ) Notice: Subject to any disclaimer, the term of this patent is extended or adjusted under 35 U.S.C. 154(b) by 110 days.

(21) Appl. No.: 14/630,199

(22) Filed: Feb. 24, 2015

(65) Prior Publication Data

US 2015/0375254 A1    Dec. 31, 2015

(30) Foreign Application Priority Data

Feb. 28, 2014 (EP) .................................... 14157281

(51) Int. Cl.
*B05C 3/02* (2006.01)
*B65G 49/04* (2006.01)
*B05C 9/12* (2006.01)
*B05C 11/08* (2006.01)
*B05D 7/26* (2006.01)
*B08B 3/10* (2006.01)

(52) U.S. Cl.
CPC .................. *B05C 3/02* (2013.01); *B05C 9/12* (2013.01); *B05C 11/08* (2013.01); *B05D 7/26* (2013.01); *B08B 3/102* (2013.01); *B65G 49/04* (2013.01); *B65G 2201/047* (2013.01)

(58) Field of Classification Search
None
See application file for complete search history.

(56) References Cited

U.S. PATENT DOCUMENTS

| 1,418,412 | A | * | 6/1922 | Watrous | .................... | C23C 2/14 |
| | | | | | | 118/54 |
| 3,010,847 | A | * | 11/1961 | Ewing | ...................... | D06B 5/00 |
| | | | | | | 118/429 |
| 3,659,550 | A | * | 5/1972 | Fulton | ....................... | B05C 3/02 |
| | | | | | | 118/421 |
| 4,722,295 | A | * | 2/1988 | Young | ....................... | B05C 3/08 |
| | | | | | | 118/416 |
| 5,951,237 | A | * | 9/1999 | Scholler | .................. | C30B 15/00 |
| | | | | | | 414/411 |
| 6,176,928 | B1 | * | 1/2001 | Baughman | ................ | B05C 3/08 |
| | | | | | | 118/417 |
| 2003/0168005 | A1 | | 9/2003 | Reinhardt | | |
| 2005/0020197 | A1 | * | 1/2005 | Wakazono | ............. | B23Q 11/08 |
| | | | | | | 451/451 |

FOREIGN PATENT DOCUMENTS

DE    4204079 A1    8/1993
EP    1319444 A2    6/2003

* cited by examiner

*Primary Examiner* — Charles Capozzi
(74) *Attorney, Agent, or Firm* — Bejin Bieneman PLC

(57) ABSTRACT

A dip tank is fillable with a liquid. An accommodation device accommodates components and is rotatingly drivable around an axis of rotation. The accommodation device and the dip tank are movable relative to each other to dip the components in the dip tank or to lift the components out of the dip tank. A splash guard is provided. A lifting device is arranged to move the splash guard relative to the dip tank.

15 Claims, 11 Drawing Sheets

METHOD AND APPARATUS FOR TREATING COMPONENTS

CROSS-REFERENCE TO RELATED APPLICATIONS

This application claims priority to European Application No. EP 14157281.8 filed on Feb. 28, 2014, which application is hereby incorporated by reference in its entirety.

BACKGROUND

The present disclosure relates to a method for treating components with a liquid and to an apparatus for treating components in a liquid, comprising a dip tank, which is fillable with the liquid, an accommodation device, rotatingly drivable around an axis of rotation, for accommodating the components, wherein the accommodation device and the dip tank are movable relative to each other, to dip the components into the dip tank and to lift them out of this, and a splash guard.

It is, for example, known from EP 1 319 444 A2 to treat mass components, contained in transportation baskets, with a cleaning, coating or treatment liquid. For this, the apparatus has a dip tank, which is fillable with liquid. Above the dip tank a transportation cart is arranged, with which the transportation baskets are movable. On the transportation cart, a basket carrier is provided in a height adjustable and rotatingly drivable manner. For treating mass components, the transportation basket is dipped into the liquid in the dip tank. Then the transportation basket is moved out of the liquid and is lifted within the dip tank into a centrifuging position. In this case, the high side walls of the dip tank serve as splash guard, which captures the liquid centrifuged off during the rotation of the mass components.

Disadvantageously, the known apparatus and especially the splash guard have to be regularly cleaned off the centrifuged liquids. Especially with varnishes and other liquids, which can cure quickly, the cleaning has to be carried out regularly and in short intervals, to prevent an encrusting of the apparatus. Thus, the known apparatus has to be serviced often and incurs high costs, as it has to be cleaned by hand during forced downtimes. Furthermore, it is disadvantageous that the liquids, captured by the splash guard, cure on the splash guard and can fall back into the liquid in solid state, so that the liquid in the dip tank can become unusable for the further treatment of mass components.

DESCRIPTION

Disclosed herein is a method that can be easily carried out, and a maintenance-friendly apparatus, for treating components with a liquid.

An exemplary method for treating components with a liquid comprises the following steps:
- providing a splash guard in a dip tank filled with the liquid,
- dipping of components into the liquid,
- moving the components out of the liquid,
- moving the splash guard relative to the dip tank into a centrifuging position surrounding the components,
- rotating the components within the splash guard, and
- moving the splash guard relative to the dip tank into a dipping position.

In other words, the splash guard is an independent component, which is movable relative to the dip tank or the components. Thus, the splash guard can be positioned around the components, when these are rotated outside of the liquid, and can regularly be dipped back into the liquid. In this manner, it is prevented, that the liquid, captured by the splash guard, is exposed for a long time to the ambient atmosphere such that it can cure on the splash guard.

Thus, it is provided to hold the splash guard in a movable manner relative to the dip tank filled with the liquid. For example, the splash guard itself, can be moved by suitable lifting devices relative to the dip tank or the components. Alternatively or in addition thereto, the dip tank can also be height adjustable. For example the dip tank can be held on a fork-lift similar transportation cart and can be moved up and down in direction of the splash guard. Thus, the splash guard can be moved during the process relative to the dip tank into a centrifuging position surrounding the components. In this case, when the splash guard is in the centrifuging position it surrounds laterally the components rotating outside the liquid to capture excessive liquid that is centrifuging off due to the rotation. However, it is not necessary to lift also the splash guard completely out of the liquid. Furthermore, the splash guard can be again moved into the dipping position after the rotation of the components. The splash guard is in the dipping position, when at least the portion of the splash guard, which captures the excessive liquid centrifuging off, during the rotation of the components, is dipped into the liquid. For example, the splash guard may be only dipped so far into the liquid that an upper portion, on which the splash guard can be lifted out of the liquid, remains dry.

The to be treated components are for example mass components like, for example, screws or other small components, which are put into a material basket for carrying out the treatment. However, a to be treated component can also be an individual component, which can also be treated according to the method and apparatus disclosed herein. The liquid can be a cleaning, coating, treatment or any varnishing liquid. For example, the liquid can be a zinc-containing coating liquid for the corrosion protection of the to be treated components.

Advantageously, the splash guard is arranged in the centrifuging position such that during rotating the components, centrifuged liquid can drip from the splash guard back into the dip tank. In this manner it is prevented that the excessive liquid contaminates areas outside of the dip tank. Further, the flowing back liquid can be used again for treating components. The splash guard can be always arranged such that, when it is not in the dipping position, the liquid adhering to the splash guard can drip back into the dip tank.

Advantageously, the splash guard is held stationary while rotation of the components. Thus, it is prevented, that the liquid, adhering to the splash guard, is centrifuged off and contaminates the apparatus.

According to an aspect of the disclosure it is provided, as a further method step, before rotating the components, that the splash guard can be coupled to a carrier device. Advantageously, as further method steps, after the coupling of the splash guard, it can be provided that a signal, representing the coupling position and that the splash guard is held on the carrier device, is registered and that the signal is transmitted to a control device. Thus, the method can be automated. Advantageously, the moving of the splash guard relative to the dip tank is carried out such that the carrier device and the dip tank are moved relative to each other.

It can be provided that the splash guard and the dip tank partially overlap each other in the centrifuging position. This means that a lower portion of the splash guard covers axially an upper portion of the dip tank. In this manner, it is securely prevented that excessive liquid can centrifuge off between the splash guard and the dip tank and that the apparatus can be contaminated.

According to a further aspect of the present disclosure it is provided as further method steps that the splash guard is moved relative to the dip tank into a turning position surrounding the components, in which position the splash guard is at least partially moved out of the dip tank, the components and the splash guard are pivoted relative to the dip tank, and that the components are turned. In contrast to the method step of turning the components in the centrifuging position, in which the components are rotated quickly, i.e., regularly with 200 up to 300 revolutions per minute in a zero position, i.e., along a vertical axis of rotation, the components are here turned over in a slow rotation, i.e., with approximately 20 to 30 revolutions per minute, continuously in a pivoted manner across an angle range between 1 and 90 degrees, especially 30, 45, 60 and 90 degrees, relative to the zero position. Due to the slow rotation in combination with the pivoting of the components, the excessive liquid, which could have adhered in spite of the quick rotation of the components in possible present cavities of the components, can be discharged. In the centrifuging position the splash guard can thus be moved partially or completely out of the dip tank.

A further subject of the present disclosure is an apparatus for treating components in a liquid, in which according to the invention a lifting device is provided for moving the splash guard relative to the dip tank and/or relative to the accommodation device or relative to the components. The lifting device is designed such that the splash guard is axially movable along a lifting axis. In this manner, the splash guard can be lifted and/or lowered. The lifting device can especially comprise pneumatically or hydraulically driven cylinders and/or a spindle drive and/or a Bowden cable.

Advantageously, the lifting device is arranged at the outside on the dip tank. Thus, it is prevented that contaminations get into the liquid.

Advantageously, a carrier device is provided, on which the splash guard is detachably mountable, wherein the carrier device is pivotable relative to a stationary frame. By coupling the splash guard to the carrier device a possibility, which is easily achievable, is provided, to hold the components during the rotation and the turning within the splash guard.

According to an aspect of the present disclosure a controllable coupling device is provided and designed such that the splash guard can be coupled to or can be decoupled from the carrier device. In this manner, the coupling process can be automated.

It can be provided that the coupling device comprises a toggle lever mechanism to fasten the splash guard in a self-locking manner to the carrier device. Thus, a secure retaining of the splash guard on the carrier device is ensured.

Furthermore, it can be provided that the carrier device has guide elements interacting with the splash guard and which are formed such that the splash guard is attachable on the carrier device concentrically to the axis of rotation. Thus, the splash guard is transferred in a reproducible manner into a holding position provided on the carrier device.

Advantageously, it is provided that the splash guard is formed to be tubular and has a larger axial longitudinal extension than at least one of following components, namely the dip tank or the accommodation device. Thus, a splash guard that can easily be manufactured is provided, which splashguard laterally encloses completely the components.

Further, the accommodation device can be detachably mountable on the carrier device, the splash guard being attachable to the carrier device in a detachable manner. A controllable coupling device can be provided and designed such that the accommodation device can be coupled to or decoupled from the same.

Advantageously, it is provided that the splash guard is arranged in a dipping position between a circumferentially extending wall of the dip tank and the accommodation device for the components. Thus, the accommodation device is already in the dipping position within the splash guard, so that, before turning the components within the splash guard, both can be moved together relative to the dip tank, without having to change the relative position of the splash guard and of the accommodation device.

An example of the disclosed subject matter is shown in the drawings and described in the following. Here it shows FIG. 1A is an example apparatus in a partially sectional perspective view in a basic position.

The drawings show an apparatus for treating components with a liquid according to an embodiment. The apparatus is, in this case, designed as a dip-turning-painting-centrifuge and serves for coating mass components, like, for example, screws or other small components, with a zinc-containing liquid.

Figure 1A:
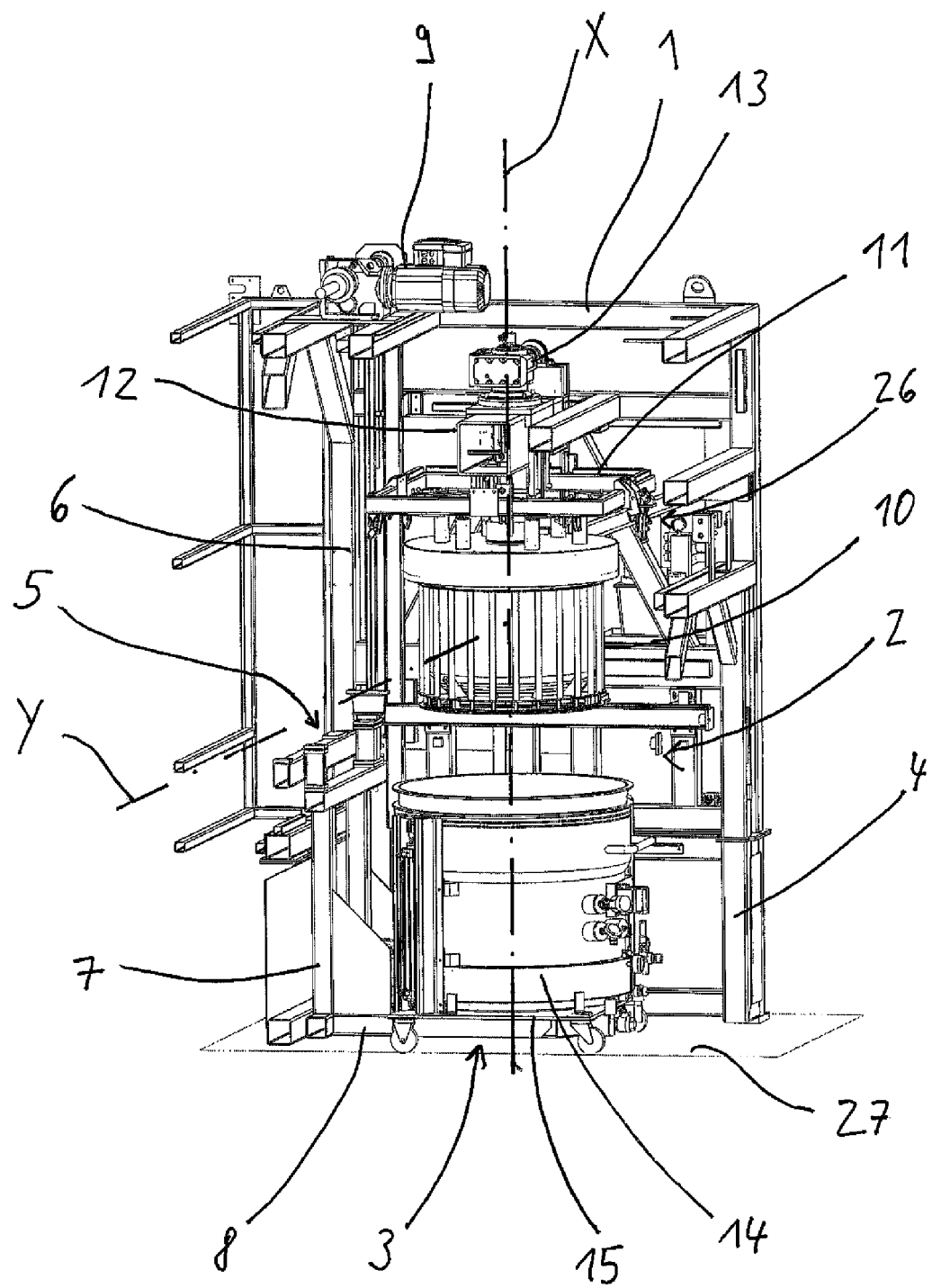
FIG. 1B is the example apparatus of FIG. 1A in a partially sectional perspective view in an intermediate position.
FIG. 1C is the example apparatus of FIG. 1A in a partially sectional perspective view in a dipping position.
FIG. 1D is the example apparatus of FIG. 1A in a partially sectional perspective view in a coupling position.
FIG. 1E is the example apparatus of FIG. 1A in a partially sectional perspective view in a centrifuging position.
FIG. 1F is the example apparatus of FIG. 1A in a partially sectional perspective view in a further intermediate position.
FIG. 1G is the example apparatus of FIG. 1A in a partially sectional perspective view in a first turning position.
FIG. 1H is the example apparatus of FIG. 1A in a partially sectional perspective view in a second turning position.
FIG. 1I is the example apparatus of FIG. 1A in a partially sectional perspective view in a third turning position.
FIG. 1J is the example apparatus of FIG. 1A in a partially sectional perspective view in a fourth turning position.
FIG. 1K is the example apparatus of FIG. 1A in a partially sectional perspective view in a fifth turning position.
FIG. 1L is the example apparatus of FIG. 1A in a partially sectional perspective view in a first decoupling position.
FIG. 1M is the example apparatus of FIG. 1A in a partially sectional perspective view in a second decoupling position.
FIG. 1N is the example apparatus of FIG. 1A in a partially sectional perspective view in a third decoupling position.
FIG. 1O is the example apparatus of FIG. 1A in a partially sectional perspective view in a fourth decoupling position.

In the basic position, shown in FIG. 1A, it can be seen that the apparatus has a stationary frame 1 enclosing a working chamber 2. In the working chamber 2, a varnish cart 3 is positioned, which can be moved into or out of the working chamber 2 via a lateral opening 4 with a gate (not shown). To be able to lift or lower the varnish cart 3, a lifting device 5 is mounted on the frame 1. The lifting device 5 comprises two vertically extending guide tracks 6, on which, analogously to a common forklift, a fork 7 with two prongs 8 is guided in a height adjustable manner by an electric motor 9.

Above the varnish cart 3, a material basket 10 is arranged, into which the to be treated components can be placed. The material basket 10 is detachably attached in a rotatingly drivable manner on a carrier device around an axis of rotation X, which is formed as a pivot frame 11. A further electric motor 13 is provided and designed to rotate the material basket 10 around the axis of rotation X. The pivot frame 11 is pivotably held on a pivot bar 12 of the stationary frame 1 and can hydraulically be pivoted around a pivot axis Y in an angle range of 0 to 90 degrees. Via a transport unit, which is not shown here, the work chamber 2 can be equipped with the material basket 10.

Figure 2A:
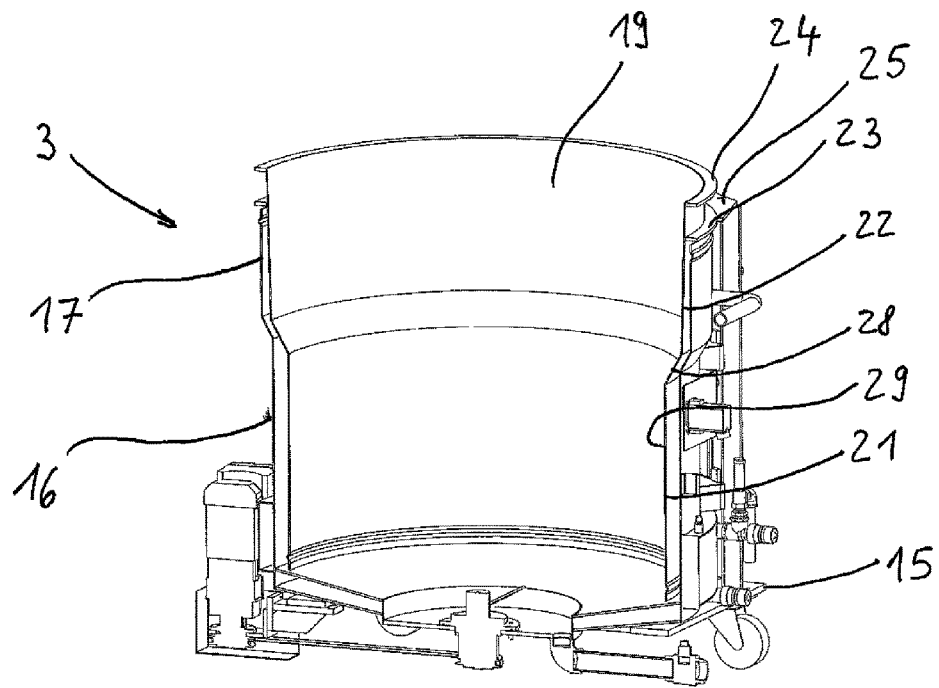
FIG. 2A is an enlarged partial view of a varnish cart of the apparatus of FIGS. 1A through 1O in a partially sectional perspective view with the splash guard being in a dipping position, wherein the apparatus is in the basic position according to FIG. 1A.
Figure 2B:
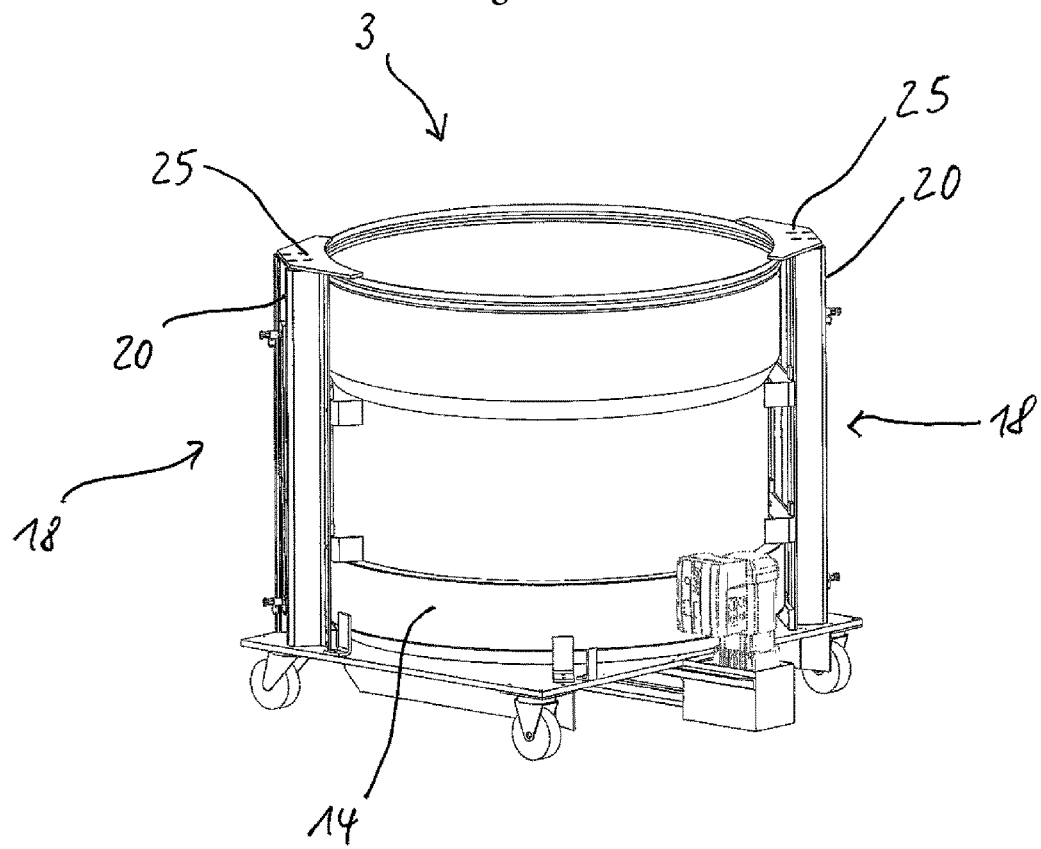
FIG. 2B is an enlarged partial view of a varnish cart of the apparatus of FIGS. 1A through 1O in a perspective view with a retracted lifting cylinder.
Figure 2C:
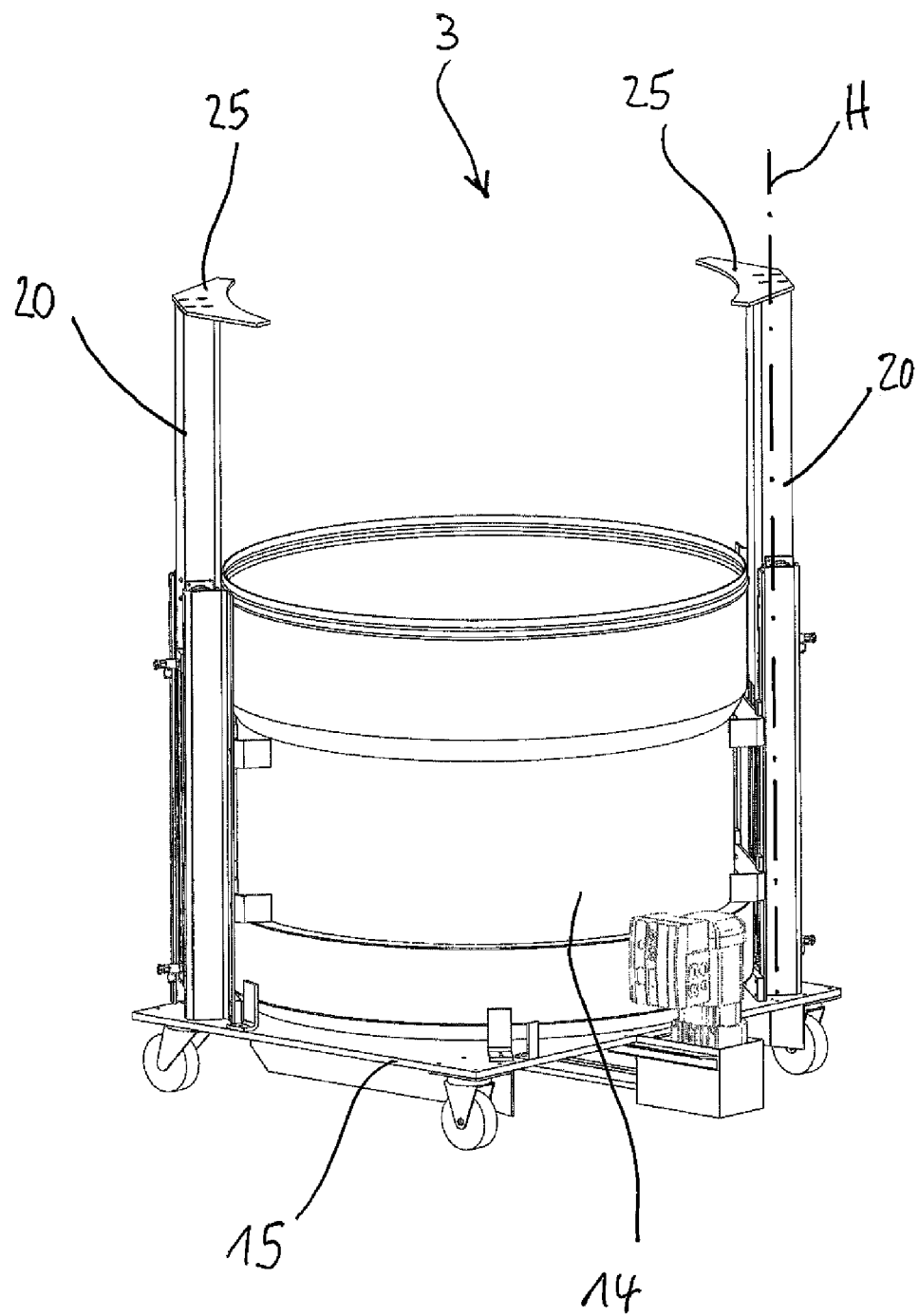
FIG. 2C is an enlarged partial view of a varnish cart of the apparatus of FIGS. 1A through 1O in a perspective view with extended lifting cylinder.

The varnish cart 3 comprises a dip tank 14, which is mounted on a transportation cart 15. In FIG. 2A it can be seen that the dip tank 14 is constructed in a stepped manner and has a lower portion 16 and an upper portion 17. The lower portion 16 extends along approximately two-thirds of the height of the dip tank 14 and is filled with the liquid during operation of the apparatus. The upper portion 17 of the dip tank 14 has a slightly larger diameter than the lower portion 16 to retain the liquid displaced during the dipping of the material basket 10 in the dip tank 14. In FIGS. 2A to 2C) it can be seen that a lifting device 18 is arranged opposite to the material basket 10 on the varnish cart 3 on the outside to axially move a splash guard 19 (not shown in FIGS. 2B and 2C. More specifically, two lifting cylinders 20, which can move the splash guard 19 along a lifting axis H and which are movable synchronously, are provided, arranged diametrically opposite to one another on outer sides of the varnish cart 3 and outside of the dip tank 14.

In FIG. 2A, the movably formed splash guard 19 can be seen. The splash guard 19 in this example is made from stainless steel, but could also be manufactured from a plastic. The splash guard 19 has a tubular or sleeve-like basic shape and is also formed in a stepped manner corresponding to the dip tank 14. A lower portion 21, which extends along approximately two-thirds of the height of the splash guard 19, has a slightly smaller diameter than an upper portion 22. At the upper end, facing the pivot frame 11, two annular collars 23, 24 are formed. The lower of the two collars 23 interacts in the dipping position of the splash guard 19 shown in FIG. 2A with the lifting device 18. More specifically, the two lifting cylinders 20 carry at their free ends respectively a support plate 25, which corresponds to the outer circumference of the splash guard 19 and the inner radius of which corresponds at least essentially to the outer radius of the splash guard 19. In the dipping position, the lower collar 23 of the splash guard 19 rests in portions on the two support plates 25. Because of the inner concave design of the support plates 25, the splash guard 19 rests in the dipping position further more radially on the plates 25, whereby the splash guard 19 is guided in the dip tank 14. Via the upper collar 24, the splash guard 19 can be detachably mounted on a controllable coupling device 26, arranged on the pivot frame 11. The exact function of the coupling device 26 is described later in detail in connection with FIGS. 4A and 4B.

Figure 1B:
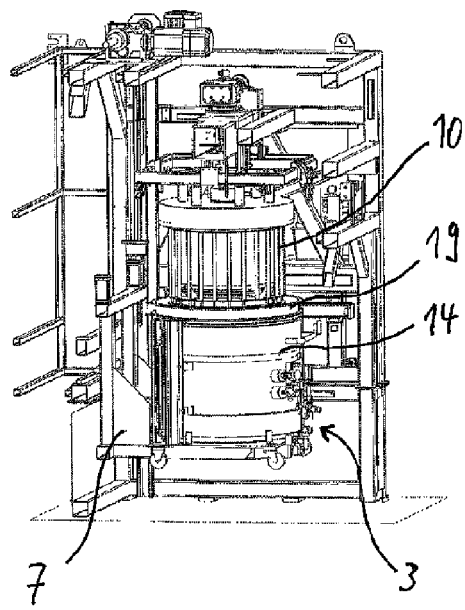
Figure 1C:
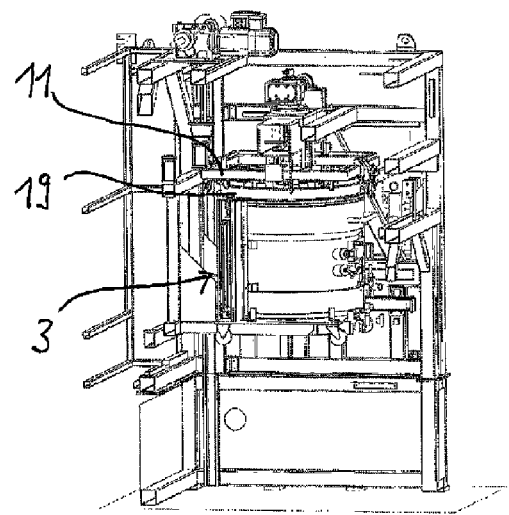
Figure 1D:
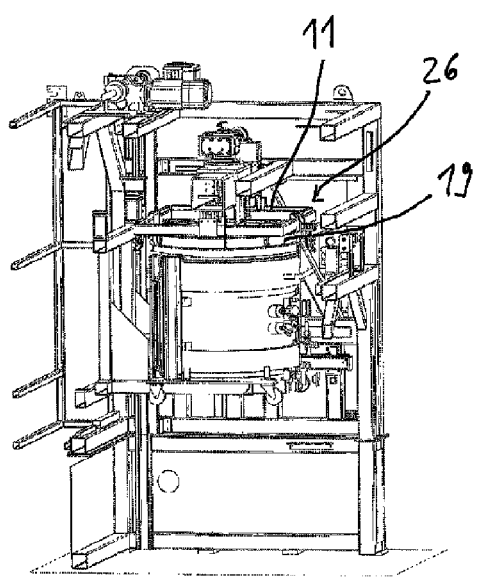
Figure 1E:
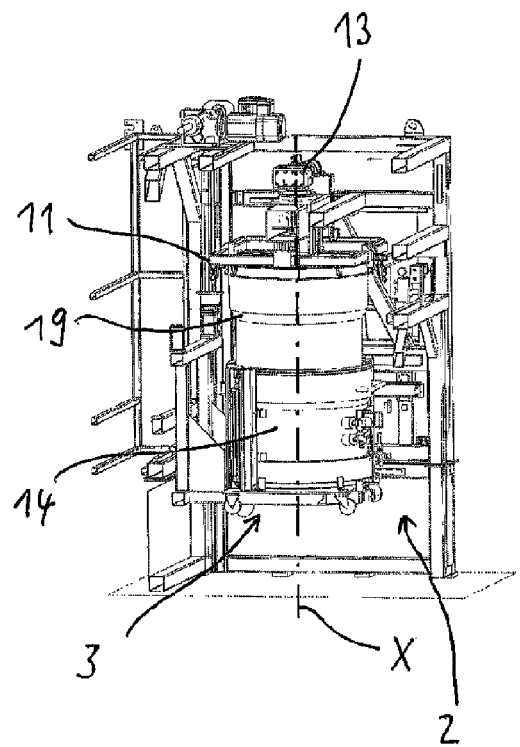
Figure 1F:
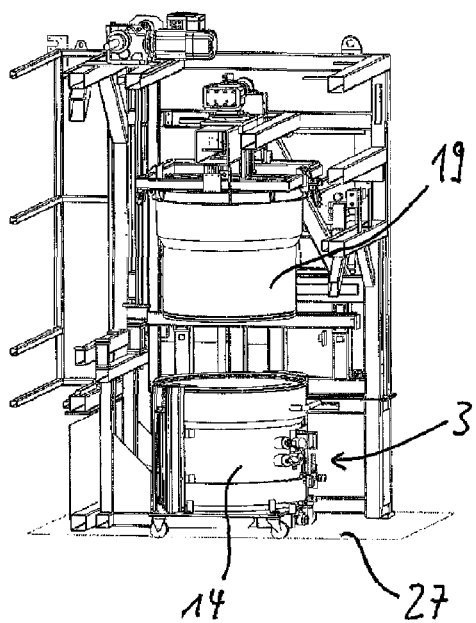
Figure 1G:
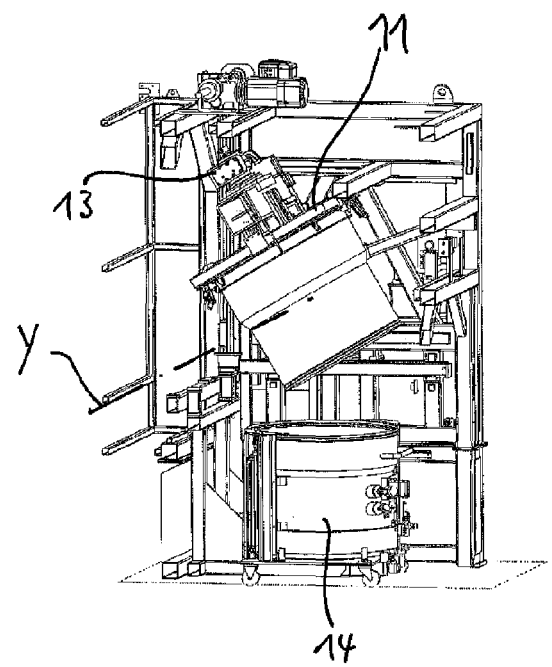
Figure 1H:
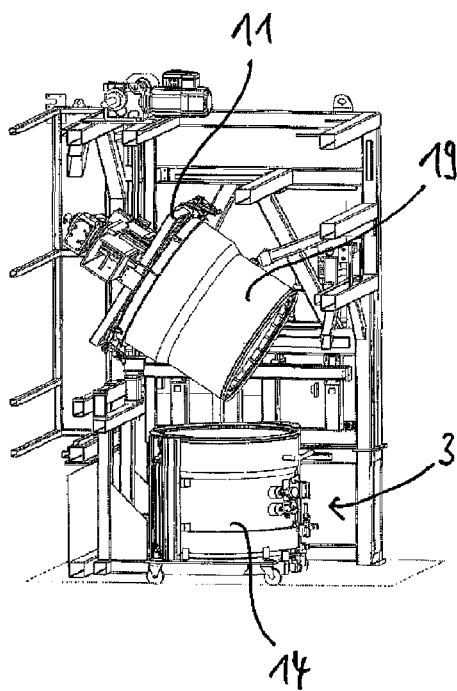
Figure 1I:
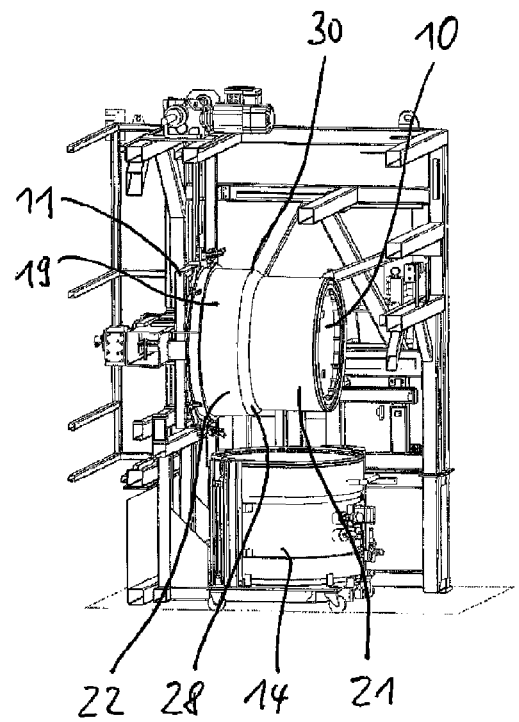
Figure 1J:
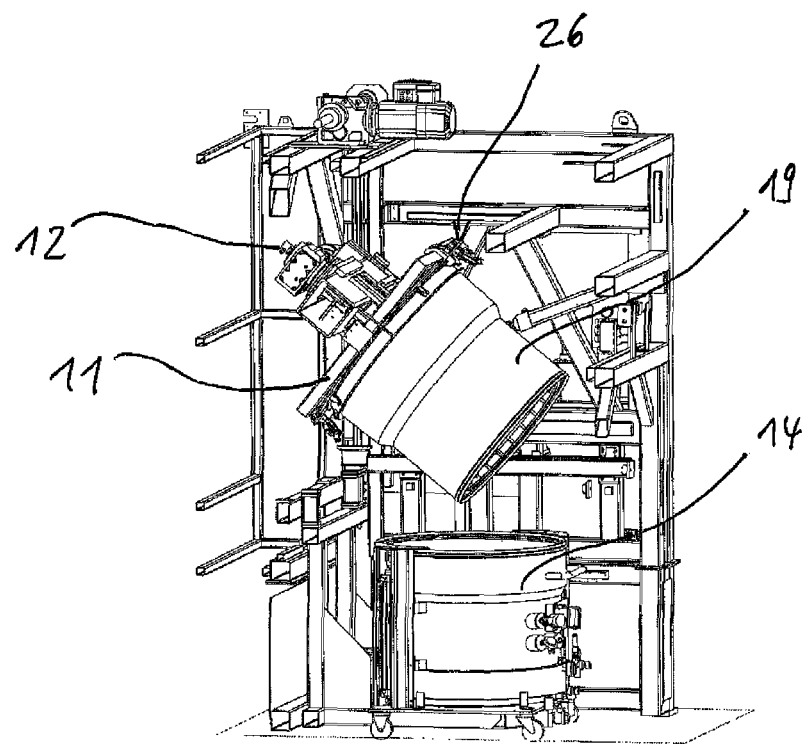
Figure 1K:
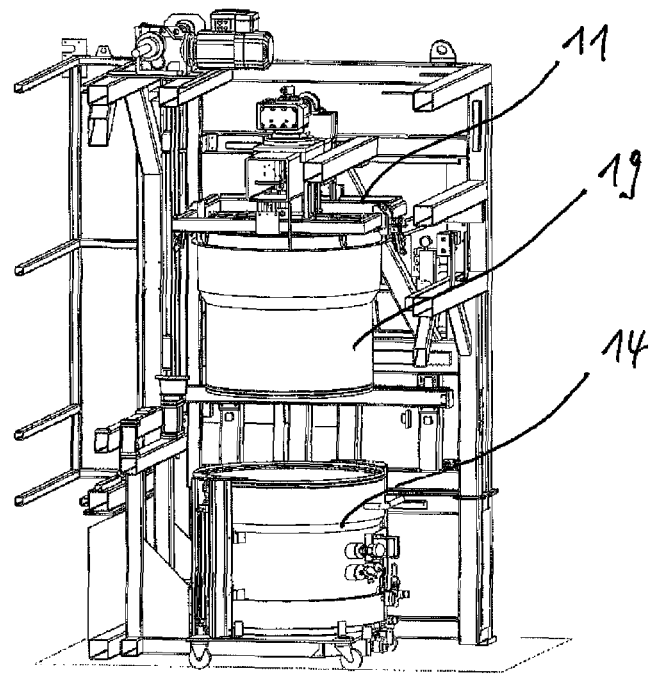
Figure 1L:
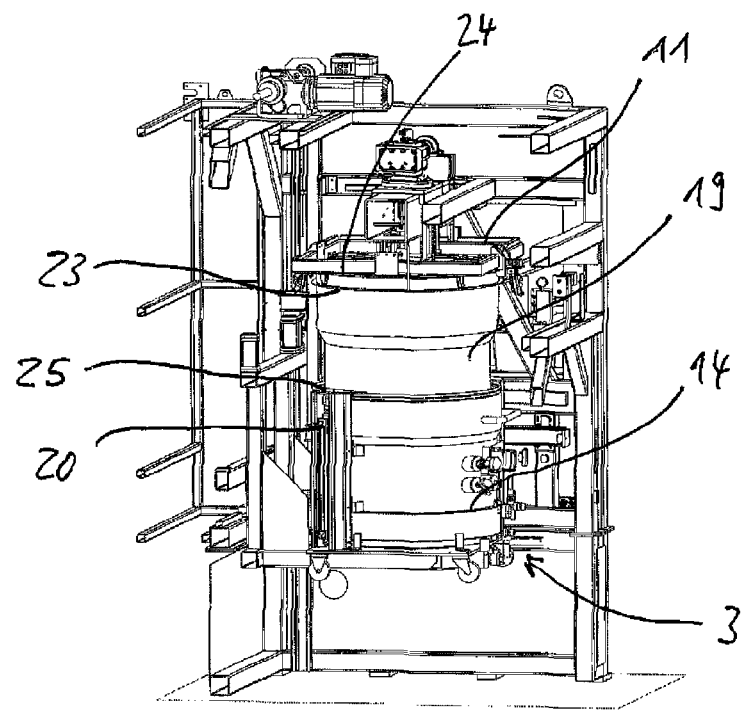
Figure 1M:
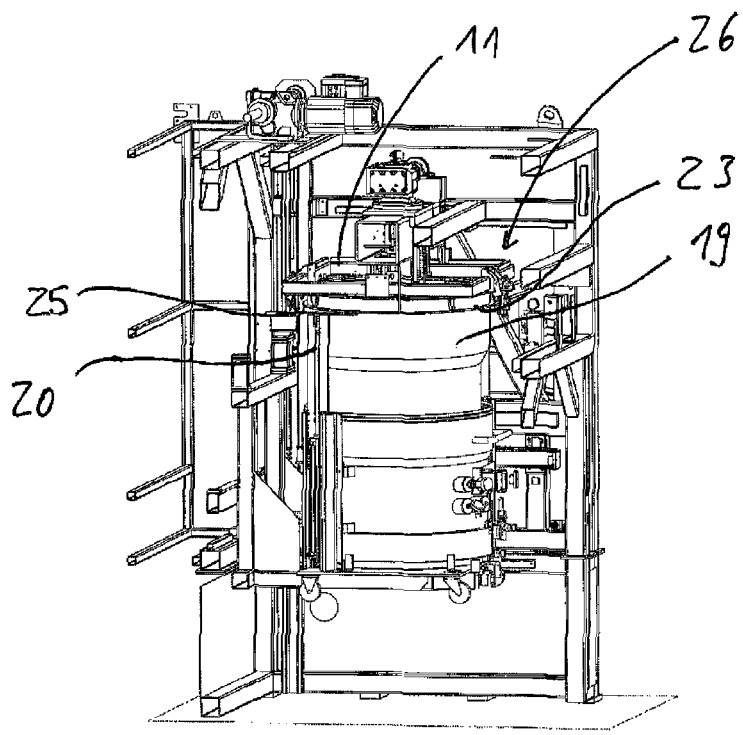
Figure 1N:
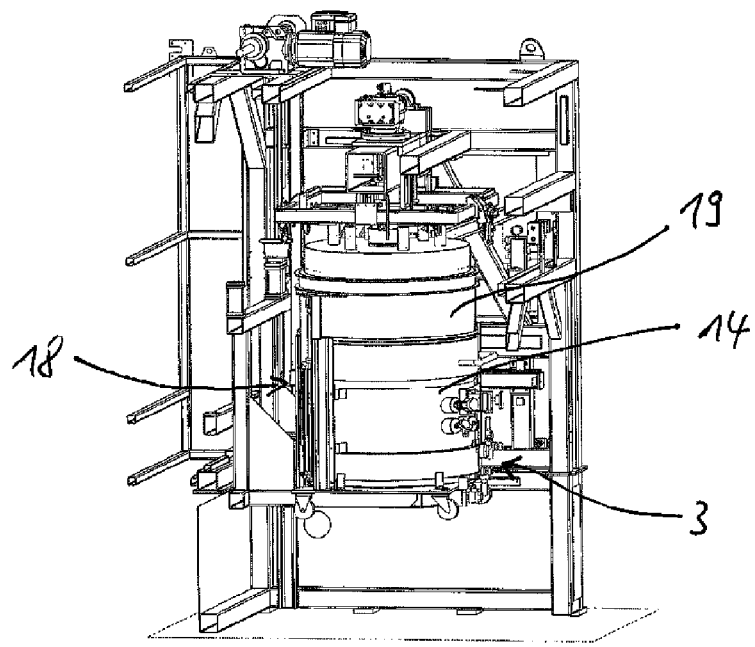
Figure 1O:
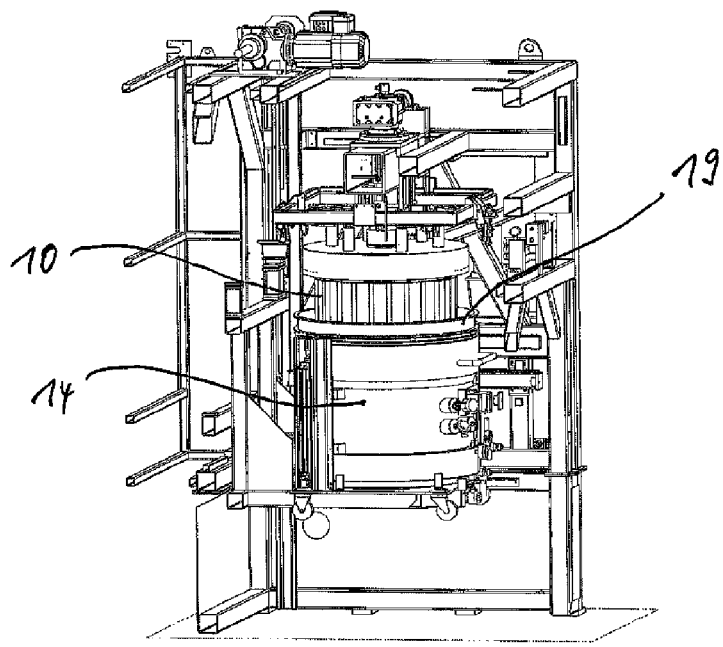

In FIGS. 1A to 1O the individual method steps are shown in chronological order and are described in detail in the following:

In the basic position, shown in FIG. 1A, the varnish cart 3, filled with liquid, rests on a base 27 of the working chamber 2 and is pushed onto the prongs 8 of the fork 7. The splash guard 19 is in the dipping position, i.e., the splash guard 19 is arranged in the dip tank 14 and is dipped with its lower portion 16 in the liquid. The material basket 10 is filled with the to be treated components and is in its zero position, in which the pivot frame 11 is not pivoted relative to the stationary frame 1. The coupling device 26 of the pivot frame 11 is released for accommodation of the splash guard 19, so that in the further process the splash guard 19 can essentially be moved up to the pivot frame 11.

FIG. 1B shows an intermediate position in which the varnish cart 3, resting on the fork 7, is moved axially upwards in direction to the material basket 10. By this movement, the splash guard 19, which is still in the dipped position, is moved towards the material basket 10, without that the relative position of the splash guard 19 is changed relative to the dip tank 14.

Figure 3:
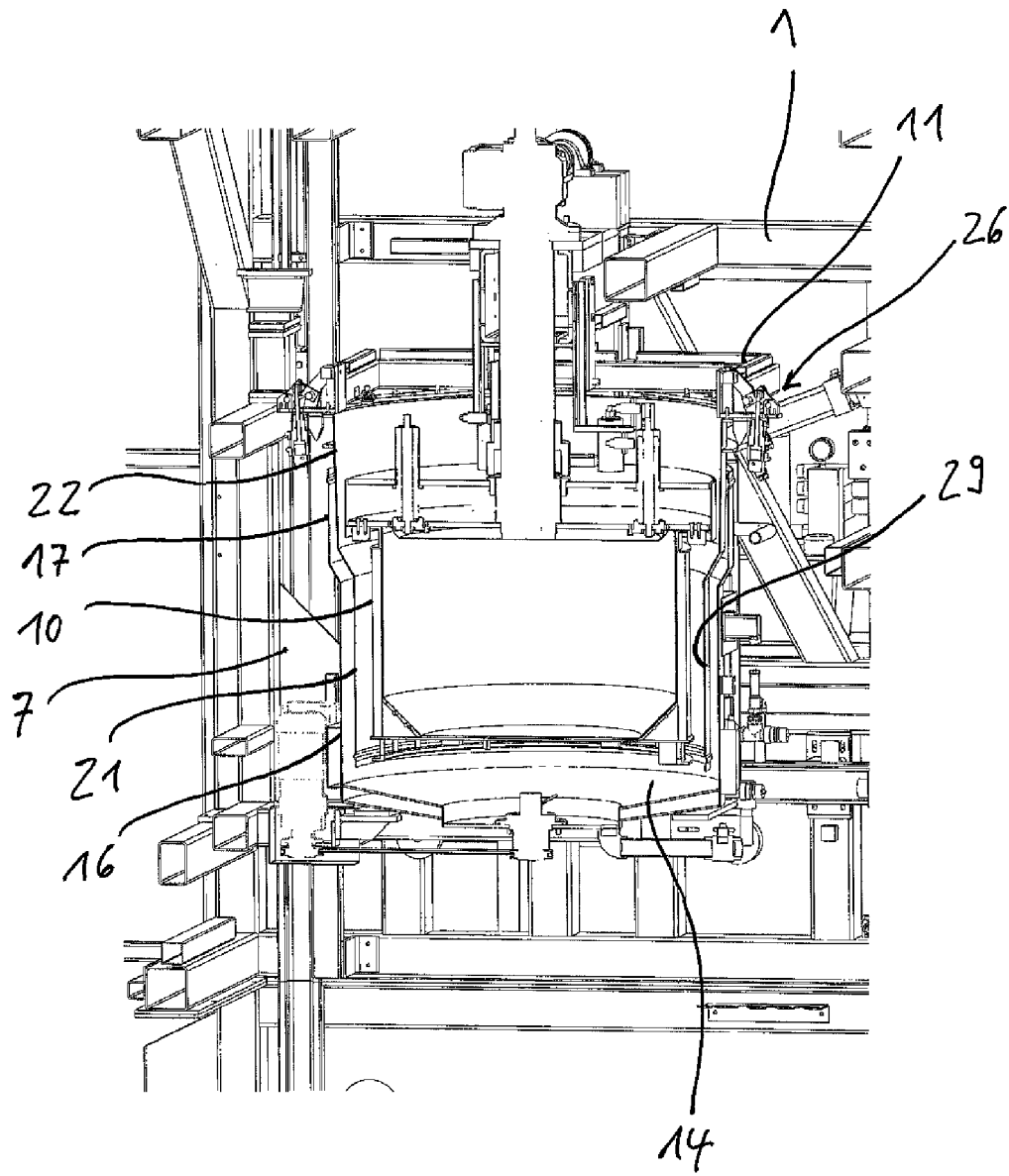
FIG. 3 is an enlarged partial view of a splash guard of the apparatus of FIG. 1 in a partially sectional perspective view with the splash guard being in the dipping position, wherein the apparatus is in the dipping position according to FIG. 1C)

In FIG. 1C, the apparatus is shown in its dipping position. The varnish cart 3 is moved completely upwards and the splash guard 19 abuts the pivot frame 11 with its end face facing the pivot frame 11. The material basket 10 is dipped into the liquid in the dip tank 8, whereby the splash guard 19, which is still in the dipping position, is now positioned between an inner wall of the dip tank 14 and the material basket 10. In FIG. 3 it can be seen that the material basket 10 engages in the dipping position in the lower portion 21 of the splash guard 19 and in a transitional portion 28, whereby the transitional position 28 is arranged between the lower and the upper portion 21, 22 of the splash guard 19. During the following rotation of the components around the axis of rotation X, the inner face of the splash guard 19 will collect mainly in the lower portion 21 and in the transitional portion 28 excess liquid, which has been centrifuged of the components, so that these portions 21, 28 of the splash guard 19 are designated in the following as capturing face 29.

FIG. 1D shows a coupling position, in which the controllable coupling device 26 is closed and the splash guard 19 is fixed to the pivot frame 11. When the splash guard 19 is securely held in the coupling position on the coupling device 26, a signal, representing the coupling position, is produced by a signaling device, not shown, and which signal is transmitted to a control unit, also not shown.

As soon as the control unit has registered the secure coupling of the splash guard 19 on the pivot frame 11, the varnish cart 3 is lowered into the centrifuging position shown in FIG. 1E. In this manner, the material basket 10 and the splash guard 19 are moved out of the liquid. However, the varnish cart 3 is only lowered so far that the splash guard 19, held stationary on the pivot frame 11, and the dip tank 14 still partially overlap one another. In the centrifuging position, the material basket 10 is rotated within the splash guard 19 by the electric motor 14 with approximately 300 revolutions per minute around the axis of rotation X.

Because of the centrifugal force, acting on the components due to the rotation, excess liquid is centrifuged off the components. The centrifuged liquid is captured by the stationary held splash guard 19 in the area of the capturing face 29. Because of the partial overlapping of the splash guard 19 and the dip tank 14, the centrifuged liquid as well as the liquid adhering also externally because of the dipping of the splash guard 19 thereon, can drip directly back into the dip tank 14. Furthermore, it is prevented, that the working chamber 2 is soiled by the centrifuged liquid. After a defined time, the rotation of the material basket 10 is again stopped. Due to the positioning of the material basket 10 within the splash guard 19 it also the liquid, dripping downwards from the material basket 10 itself, gets directly into the dip tank 14.

In the further intermediate position, shown in FIG. 1F, the varnish cart 3 is again lowered into its basic position back on the base 27 of the apparatus. It can be seen that the dip tank 14 is arranged as well in this position below the splash guard 19 such that the liquid dripping from the splash guard 19 can directly drip into the dip tank 14.

Subsequently, the pivot frame 11 is pivoted around the pivot axis Y starting from the zero position. In FIGS. 1G to 1I, three turning positions are shown by way of example. The pivot frame 11 can be pivoted continuously between 0 degree and 90 degrees, wherein during turning of the components only one or selectively also several turning positions can be aimed at. The varnish cart 3 is in all turning positions always arranged below the splash guard 19 such that the liquid, captured by the splash guard 19, can drip directly into the dip tank 14. In FIG. 1G, the pivot frame 11 is arranged pivoted by approximately 30 degrees from the zero position. In FIG. 1H or 1I, respectively, the pivot frame 11 is pivoted by 60 degrees or 90 degrees, respectively, from the zero position. In the turning positions, the material basket 10 is rotated by the electric motor 13 at approximately 20 to 30 revolutions per minute. In this case, the components are constantly turned within the material basket 10, wherein, for example, inner ribs in the material basket 10 can further increase the turning process. In this manner, possible excess liquid, which has been held in spite of the centrifuging still in holes, slots or other indentations of the components, can drip off. By the widening of the splash guard 19 between the lower and the upper portion 21, 22, a circumferentially extending outer drip edge 30 is formed in the transitional portion 28, due to which also in the third turning position, pivoted by 90 degrees, the liquid, adhering also on the outside of the splash guard 19 because of the dipping of the splash guard 19 into the liquid, can drip back into the dip tank 14.

In FIG. 1J a fourth turning position is shown, in which the pivot frame 11 transfers the material basket 10 and the splash guard 19 back into the zero position. In this fourth turning position, the pivot frame 11 is pivoted by 45 degrees starting from the zero position. The material basket 10 can further slowly be rotated or can be stopped.

In the fifth turning position according to FIG. 1K, the material basket 10 and the splash guard 19 are transferred back into the zero position. In this position, the material basket 10 can further be slowly rotated or can already be at rest.

In FIG. 1L a first of four decoupling positions is shown, in which the splash guard 19 is moved back into the dip tank 14. The varnish cart 3 is initially positioned at a height corresponding to the centrifuging position. The key factor is, in this case, that the material basket 10 is not dipped back into the liquid, to prevent a renewed dipping of the components into the liquid.

To be able to move the splash guard 19 from this position of the varnish cart 3, distanced from the pivot frame 11, back into the dip tank 14, the two pneumatically actuated lifting cylinders 20 are extended synchronously in direction of the splash guard 19. In the second decoupling position, shown in FIG. 1<, the two cylinders 20 are already completely extended. The curved support plates 25 of the lifting cylinders 20 are moved from below up to the lower collar 23 of the splash guard 19. As soon as the two lifting cylinders 20 support the splash guard 19, a corresponding signal is transmitted to the control unit. The control releases then the coupling device 26, whereupon the splash guard 19 is decoupled from the pivot frame 11.

In the third decoupling position, shown in FIG. 1N, the splash guard 19 is already lowered via the lifting device 18 of the varnish cart 3 in a direction of the dip tank 14.

In the fourth decoupling position, shown in FIG. 1O, the splash guard 19 is again guided back into its dipping position. Thus, the splash guard 19 is again lowered into the dip tank 14, wherein at least the capturing face 29 and the outer face of the splash guard 19, which is congruent with the capturing face 29, are completely dipped in the liquid.

Finally, the varnish cart 3 is again lowered into the basic position according to FIG. 1A onto the base 27 of the working chamber 2.

Then, the material basket 10 and if necessary also the varnish cart 3, can be moved out of the stationary frame 1, to fill these again or to exchange it with a further material basket 10 already newly filled or a further varnish cart 3.

Figure 4A:
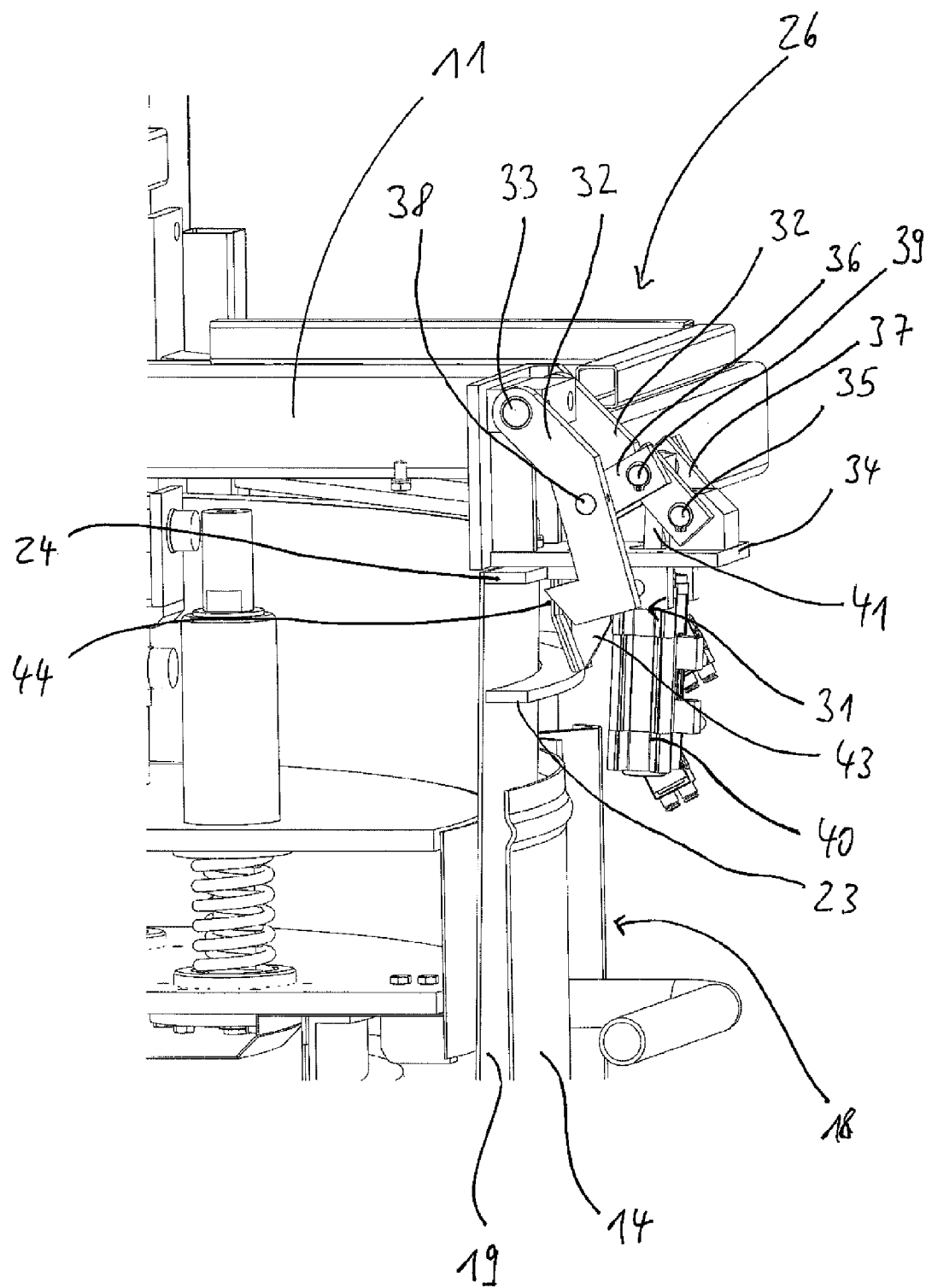
FIG. 4A is an enlarged partial view of an example coupling device of the apparatus of FIG. 1A in the opened condition in a partially sectional perspective view.
Figure 4B:
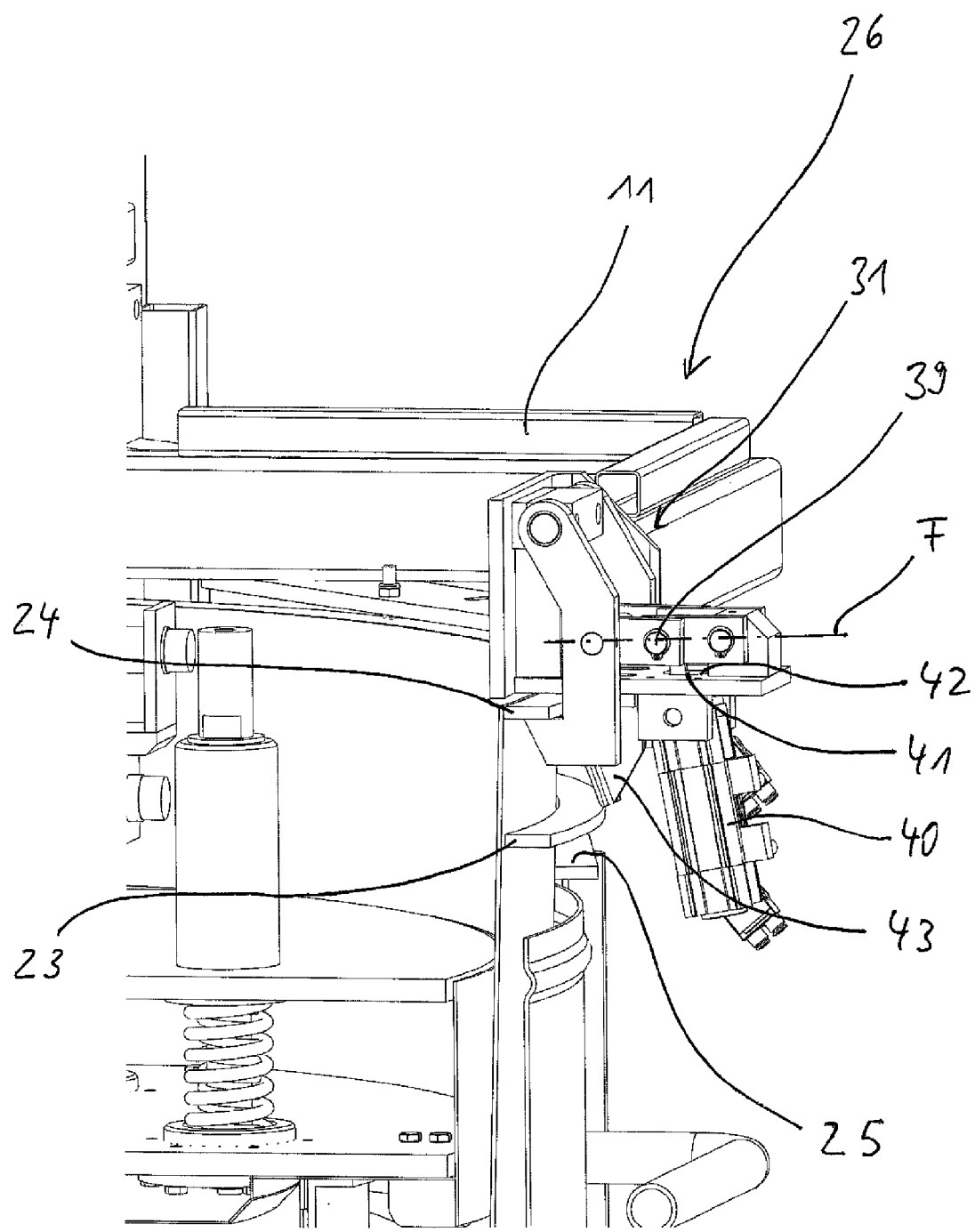
FIG. 4B is an enlarged partial view of an example coupling device of the apparatus of FIG. 1A in the closed condition in a partially sectional perspective view.

In the following the function of the coupling device 26 is described in detail by using the two FIGS. 4A and 4B:

In FIG. 4A the coupling device 26 is shown in its open condition, in which the splash guard 19 can be moved up to the pivot frame 11. In FIG. 4B the coupling device 26 is closed, so that the splash guard 19 is retained on the pivot frame 11 and the lifting device 18 can again be lowered.

More specifically, the coupling device 26 has two hydraulically actuatable toggle lever gripping elements 31 of a toggle lever mechanism, which are arranged laterally on the pivot frame 11. Each toggle lever gripping element 31 comprises two gripping elements 32, which are rotatably held on the pivot frame 11 via respectively one first pivot point 33. Below the first pivot point 33, a plate 34 projects laterally from the pivot frame 11, which carries the further elements of the toggle lever mechanism. Via a second pivot point 35, the gripping elements 32 are rotatably held on the respective plate 34. Each of the gripping elements 32 is rotatably connected via a first leg 36 and a second leg 37 to the second pivot point 35. Each of the first legs 36 is rotationally connected at an end portion 38 to a respective gripping element 32 and is rotatably connected at a further end portion to the respective second leg 37 via a third pivot point 39. In FIG. 4A, it can be seen that the rotational connection 38 between the first leg 36 and the gripping elements 32 is arranged together with the second pivot point 35 in the coupled position on one alignment line F. As soon as the third pivot point 39 is arranged on or slightly below this alignment line F, the dead center of the toggle lever mechanism is reached or is exceeded. In this manner, the toggle lever gripping elements 31 are self-inhibitingly locked and can only be opened by acting with a force, acting axially upwards, on the third pivot point 39. For this, respectively, one pneumatic cylinder 40 is provided, which piston 41 is rotatably connected to the assigned first and second legs 36, 37 on the third pivot point 39. The cylinders 40 are respectively mounted on the underside of the plates 41 and engage through an opening 42 through the plate 34. When the piston 41 is extended from the position shown in FIG. 4A, the respective toggle lever mechanism is pushed out of its dead centre and the gripping elements 32 are moved away outward from the upper collar 24 of the splash guard 19.

So that the splash guard 19 always exactly reaches the position on the pivot frame 11 that is provided for coupling to the coupling device 26, the splash guard 19 is, during the lifting of the dip tank 14, kept positioned in the dipping position by several centering elements 43 concentrically to the axis of rotation X on the pivot frame 11. More specifically, the centering elements 43 are respectively arranged on the underside of the plates 34, on which also components of the coupling device 26 are held. On end portions of the centering elements 43, facing the plates 34, the inner faces 44, facing each other, extend straight, i.e., parallel to the axis of rotation X. The distance of the two inner faces 44 to each other corresponds at least approximately to the outer diameter of the upper collar 24. On their free end portions, facing downwards, the centering elements 43 are formed inclined, so that their inner faces 44 extend by approximately 30° radially outward. Because of the inclined shape of the free end portions of the centering elements 43, the splash guard 10 is, during lifting, permanently guided and centered in its predetermined coupling position. The straight end portions of the centering elements 43 in addition to their guiding function during the coupling of the splash guard 19 perform a support function in a radial direction. More specifically, the splash guard 19 abuts in the coupling position with its upper collar 24 flush with the centering elements 43 at their straight portions, so that when pivoting the pivot frame 11, the splash guard 19 is supported on the centering elements 43. Insofar, the centering elements 43 can also be designated as support elements.

The invention claimed is:

1. A method for treating components with a liquid, comprising:
    providing an apparatus, comprising: a dip tank that is fillable with the liquid; a basket that is rotatingly drivable around an axis of rotation, wherein the basket and the dip tank are movable relative to each other to dip components in the basket in the dip tank or to lift the components out of the dip tank; a splash guard that is movable, relative to the dip tank and the basket, between a centrifuging position surrounding the basket when the basket is out of the liquid and a dipping position in the dip tank; and a lifting device arranged to move the splash guard relative to the dip tank; wherein in the dipping position, the splash guard is arranged between a circumferentially extending wall of the dip tank and the basket;
    placing the components into the basket;
    providing the splash guard in the dip tank filled with the liquid;
    dipping the basket with the components into the liquid;
    moving the basket with the components out of the liquid;
    moving the splash guard relative to the dip tank into the centrifuging position surrounding the basket with the components;
    rotating the basket with the components within the splash guard; and
    moving the splash guard relative to the dip tank into the dipping position.

2. The method of claim 1, wherein the splash guard is arranged in the centrifuging position such that, while rotating the basket with the components, centrifuged liquid can drip from the splash guard back into the dip tank.

3. The method of claim 1, wherein the splash guard is held stationary when the basket with the components rotate.

4. The method of claim 1, further comprising, before rotating the basket with the components, coupling the splash guard to a frame.

5. The method of claim 4, further comprising, after the coupling of the splash guard, recording a signal representing the coupling position that the splash guard is held on the frame, and transmitting the signal to a control unit.

6. The method of claim 4, wherein moving the splash guard relative to the dip tank is carried out such that the frame and the dip tank are moved relative to each other.

7. The method of claim 1, wherein the splash guard and the dip tank partially overlap each other in the centrifuging position.

8. The method of claim 1, further comprising:
    moving the splash guard relative to the dip tank into a turning position surrounding the basket with the components in which the splash guard is moved at least partially out of the dip tank;
    pivoting the basket with the components and the splash guard relative to the dip tank; and
    turning the basket with the components.

9. An apparatus for treating components in a liquid, comprising
    a dip tank that is fillable with the liquid;
    a basket that is rotatingly drivable around an axis of rotation, wherein the basket and the dip tank are movable relative to each other to dip components in the basket in the dip tank or to lift the components out of the dip tank;
    a splash guard that is movable, relative to the dip tank and the basket, between a centrifuging position surrounding the basket when the basket is out of the liquid and a dipping position in the dip tank; and
    a lifting device arranged to move the splash guard relative to the dip tank;
    wherein in the dipping position, the splash guard is arranged between a circumferentially extending wall of the dip tank and the basket.

10. The apparatus of claim 9, wherein the lifting device is arranged at the outside on the dip tank.

11. Apparatus according claim 9, further comprising a frame on which the splash guard is detachably mountable, wherein the frame is pivotable relative to a stationary frame.

12. The apparatus of claim 11, further comprising a controllable coupling that is mounted to the frame and including a gripping element that is movable such that the splash guard can be coupled to or can be decoupled from the frame.

13. The apparatus of claim 12, wherein the coupling comprises a toggle lever mechanism to fasten the splash guard in a self-locking manner to the carrier device.

14. The apparatus of claim 11, wherein the frame has guide elements interacting with the splash guard and which are formed such that the splash guard is attachable on the frame concentrically to the axis of rotation.

15. The apparatus of claim 9, wherein the splash guard is tubular and has a larger axial longitudinal extension than at least one of the dip tank and the basket.

* * * * *